(12) United States Patent
Stone

(10) Patent No.: US 6,305,730 B1
(45) Date of Patent: Oct. 23, 2001

(54) VEHICLE STORAGE TRUNK CREATION SYSTEM

(76) Inventor: Herb Stone, 111 Briny Ave., PH9, Pompano Beach, FL (US) 33062

( * ) Notice: Subject to any disclaimer, the term of this patent is extended or adjusted under 35 U.S.C. 154(b) by 0 days.

(21) Appl. No.: 09/543,501

(22) Filed: Apr. 6, 2000

(51) Int. Cl.[7] ....................................................... B60R 5/04
(52) U.S. Cl. ...................... 296/37.6; 296/37.5; 296/37.16
(58) Field of Search .................................. 296/37.5, 37.6, 296/37.16, 24.1, 76

(56) References Cited

U.S. PATENT DOCUMENTS

| | | |
|---|---|---|
| 4,938,519 | 7/1990 | Schlachter . |
| 5,324,089 * | 6/1994 | Schlachter ............................ 296/37.5 |
| 5,564,768 * | 10/1996 | Saffold ................................. 296/37.6 |
| 6,065,794 * | 5/2000 | Schlachter ............................ 296/37.6 |
| 6,113,179 * | 9/2000 | Szigeti .......................... 396/37.16 X |

* cited by examiner

Primary Examiner—Joseph D. Pape
(74) Attorney, Agent, or Firm—Salzman & Levy (57) ABSTRACT

The present invention is directed towards a new and improved storage trunk creation system for a vehicle having a load deck, deck sidewalls and a tailgate. The storage trunk creation system is securely mounted on a jeep style vehicle between the back of the front seats and the rear tailgate, and from one side of the jeep sidewall to the other. The storage trunk creation system has a hingedly attached top surface or access door that is engaged in a locked position when the tailgate is closed. When the tailgate is open, the access door may be lifted up from the storage trunk space crated by the system. The access door may also have a rack mounted to its outer, upper surface to further store items when the top is in the locked position.

16 Claims, 7 Drawing Sheets

VEHICLE STORAGE TRUNK CREATION SYSTEM

FIELD OF THE INVENTION

This invention relates generally to vehicle storage systems and, more particularly, to a vehicle storage system for the rear compartment of an open-backed jeep style vehicle to create a secured cargo area.

BACKGROUND OF THE INVENTION

Jeep style vehicles, having open back ends, have been used as modes of transportation for some time. A jeep style vehicle offers many advantages over a traditional car or truck, one of which is a set of enhanced recreational qualities. For example, the vehicles typically have removable, canvas tops, affording the driver an opportunity to enjoy the openness of the vehicle while driving. In addition, many parts of the vehicle are easily removed, which also contribute to the openness of the vehicle. Specifically, the doors and the back seats are typically removable. These vehicles are also highly maneuverable, due to their small turning radius and short length. Both driving and parking ease have therefore increased relative to other cars and trucks. They are both economical and dependable for use on almost any terrain.

Unlike conventional automobiles, however, jeep style vehicles do not have lockable, weatherproof, storage trunks for storing items. When the back seats are in place, the storage- or cargo-carrying area of a jeep style vehicle is defined merely by a space between the back seat and the tailgate. This space is generally very small and not secure. In fact, although a canvas top is generally provided to shield against rain and direct sunlight, the vehicle is referred to as open-backed, for purposes of this description. Concomitant problems associated with such open-backed vehicles include inefficient heating and air conditioning, for obvious reasons. Audio equipment, too, become less efficient with this unenclosed space.

Users of jeep style vehicles, however, often require a secured cargo area for running errands around town, for example. Users may have tools, tool boxes, camping equipment, gifts, groceries, or other valuable items that may be left in the rear cargo area. Without a secured compartment, the users must either transport the items with them if they leave the vehicle, or risk having them stolen. Accordingly, there is a need in the art for a system which creates a secured cargo area in a jeep style vehicle.

Storage enclosures have been provided for securing portable property such as tools and equipment onto the load bed of an open deck vehicle. Such storage units are mounted onto or along the sidewalls of the open deck. Presently, conventional storage enclosures are approximately the size and shape of a steamer truck and are installed at a forward location on the load bed just behind the cab. However, such prior art storage units are fairly small in size, thereby limiting the number and size of items to be carried or stored.

Many contractors and craftsmen, finding such storage enclosures to be inadequate, have adapted camper shells and canopies for attachment to the load bed sidewalls for securing portable equipment and tools. Others have attempted to secure their valuables by a slidable tonneau cover that attaches onto the sidewalls of the load bed. Although somewhat useful for their intended purpose, none of the prior art devices have proven to be entirely satisfactory. Specifically, many of these devices are not secure, weatherproof, stylish or aesthetically pleasing. Essentially, the prior art devices, for the most part, are separable, stand-alone items, not integrated with the vehicle. That is, they fail to provide the function of a trunk, such as are common with conventional automobiles.

One device developed to address this need is disclosed in U.S. Pat. No. 4,938,519 issued to Schlachter on Jun. 3, 1990, describing a locking security enclosure for an open deck vehicle. Although the invention does address the need to secure items when enjoying the advantages of an open deck vehicle, it allows for storage of only a very few items. Accordingly, there is still a need in the art for a system that provides a secured storage compartment in the rear cargo area of a jeep style vehicle. Any such system should be an integral part of the vehicle as is a trunk in conventional automobiles. The present invention is particularly suited to overcome the problems remaining in the art in a manner not previously known.

SUMMARY OF THE INVENTION

In accordance with the present invention, there is provided a new and improved storage trunk creation system for a vehicle having a load deck, deck sidewalls and a tailgate. The trunk creation system is securely mounted on a jeep style vehicle between the back of the front seats and the rear tailgate, and from one side of the jeep sidewall to the other. The trunk creation system has a hingedly attached top surface that is engaged in a locked position when the tailgate is closed. When the tailgate is open, the hingedly attached top may be lifted up from the trunk space created by the system. The top may have a rack mounted to its outer surface to further store items on top of the trunk creation system when the top is in the locked position.

It is an object of the present invention to provide a new and improved trunk creation system for a vehicle having a load deck, deck sidewalls and a tailgate.

It is another object of the present invention to provide such a system which creates a secured storage compartment.

It is a further object of the present invention to provide such a system which can be used to store items out of sight of passersby and afford protection from the elements.

It is also an object of the present invention to provide such a system which is adaptable for use with existing vehicles and newly manufactured vehicles.

It is a further object of the present invention to provide such a system which becomes an integral part of the vehicle.

It is yet another object of the present invention to provide such a system which is structured for use with vehicles having a roll bar.

It is yet a further object of the present invention to provide such a system with a watertight storage compartment.

These and other objects and advantages of the present invention will become more readily apparent in the description which follows.

BRIEF DESCRIPTION OF THE DRAWINGS

A complete understanding of the present invention may be obtained by reference to the accompanying drawings, when taken in conjunction with the detailed description thereof and in which.

Like reference numerals refer to like parts throughout the several views of the drawings.

DESCRIPTION OF THE PREFERRED EMBODIMENT

Before explaining the disclosed embodiment of the present invention in detail, it is to be understood that the invention is not limited in its application to the details of the particular arrangement shown, since the invention is capable of other embodiments.

Generally speaking, the invention is a mechanism to create a secured storage trunk for open-backed vehicles. The apparatus may be installed, used, and removed with a minimal degree of effort. The apparatus comprises a storage or cargo trunk body and a cargo trunk lid or access door that is connected to the cargo trunk body.

Figure 1:
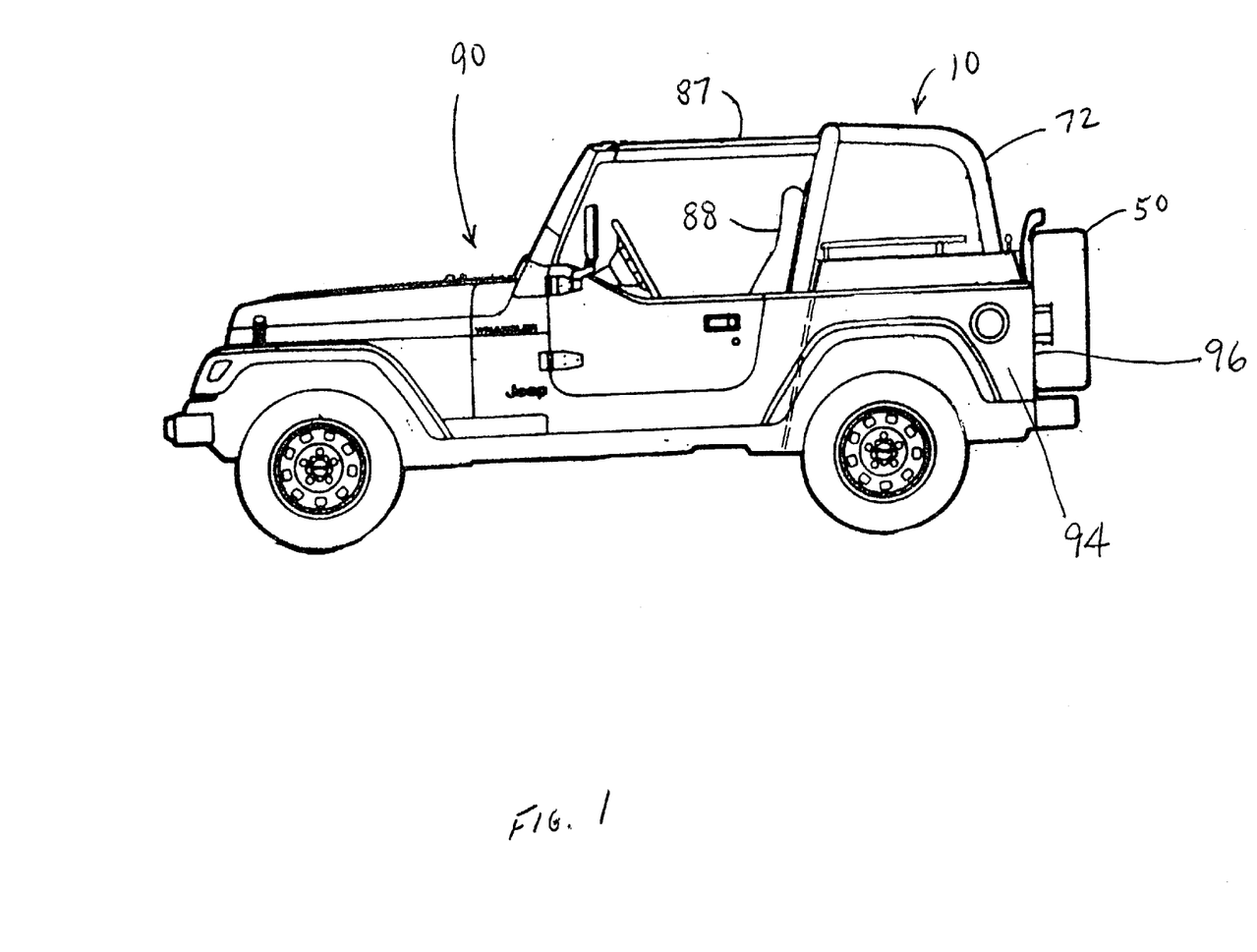
FIG. 1 is a side elevation view of a vehicle with the trunk creation system in accordance with the present invention installed therein.

As shown in FIG. 1, the present invention is directed towards a new and improved storage trunk creation system 10 for a vehicle 90 having a canvas top 87, load deck 92 (FIG. 7), deck sidewalls 94, and a tailgate 96. In the preferred embodiment, the vehicle 90 is a jeep-style vehicle, such as those sold with the Wrangler trademark.

The vehicle 90 has a front driver and passenger seats 88 and either no rear seats or removable rear seats. A spare tire 50 is typically mounted to the tailgate.

The trunk creation system 10 is structured for placement in the vehicle 90 in the cargo area, shown generally at reference numeral 89, created by the removal of the rear seats (not shown). It becomes integrated with such a vehicle to provide a secure, 20 cubic foot compartment for vehicles having no storage trunk. It should be appreciated, however, that the vehicle storage trunk creation system 10 of the present invention may be utilized with any open-backed vehicle having a load deck and deck sidewalls.

Figure 2:
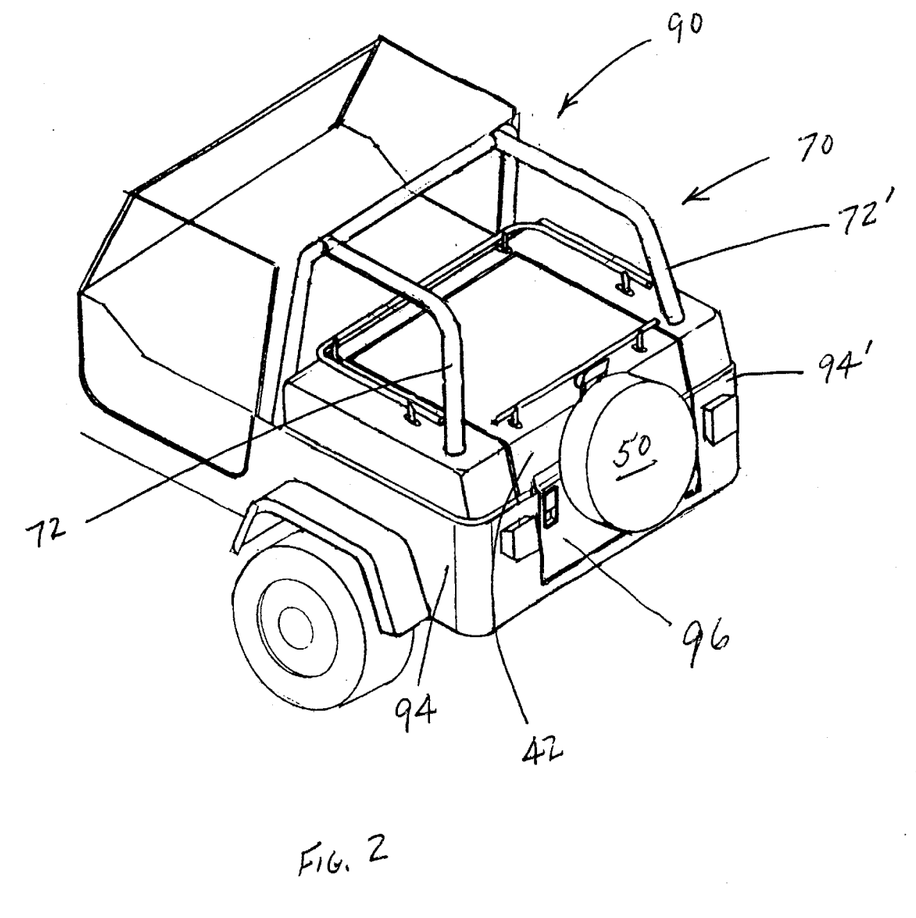
FIG. 2 is a top perspective view of a vehicle with the trunk creation system installed therein.
Figure 3:
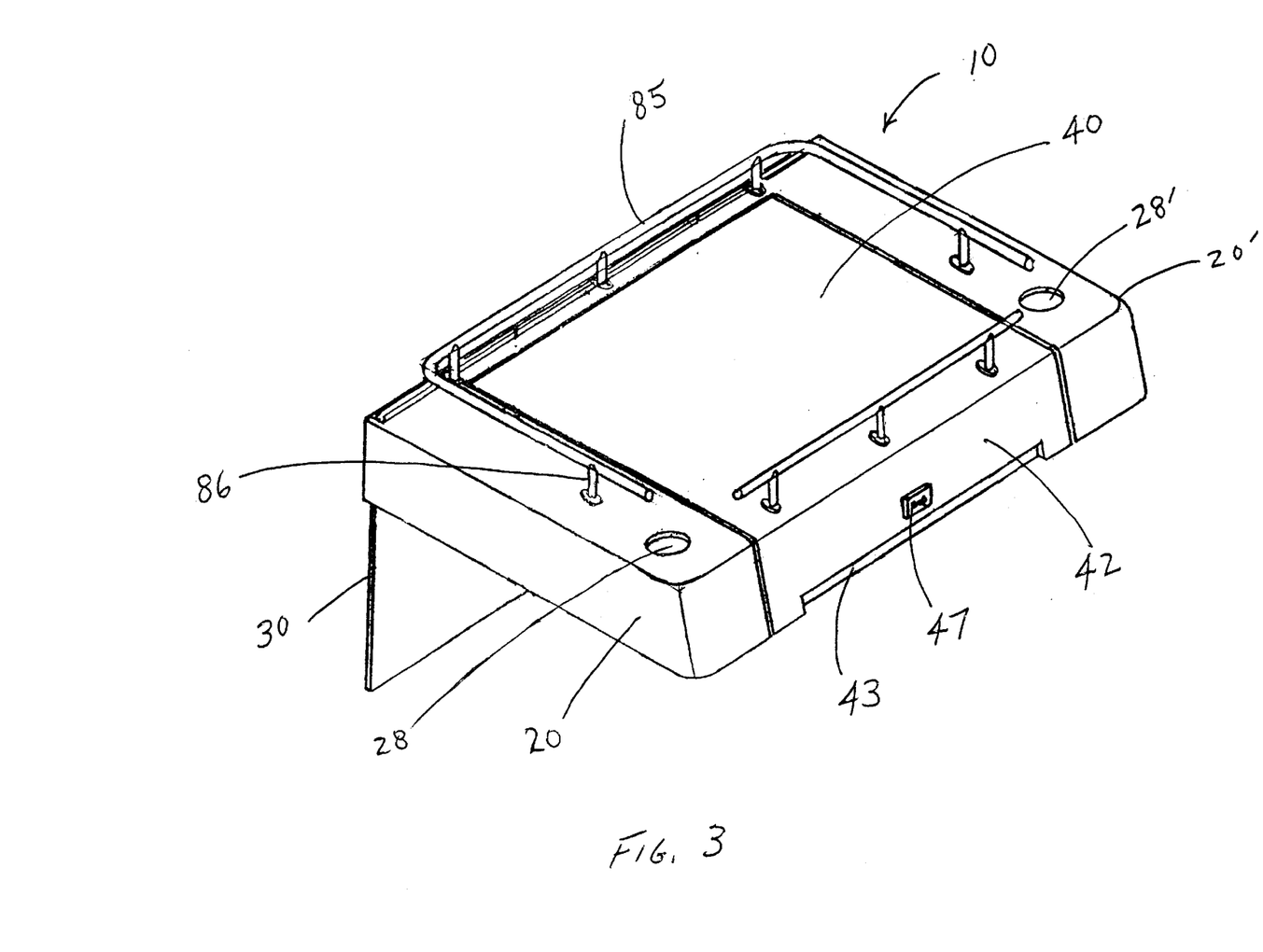
FIG. 3 is a top perspective view of the trunk creation system of the present invention.

Referring now also to FIG. 3, the trunk creation system 10 comprises a pair of side panels 20 and 20', an end panel 30 and an access door or lid 40. In the preferred embodiment, one of the side panels 20 is mounted over the deck sidewall 94 (FIG. 1) on the left side of the vehicle 90. The second side panel 20' is mounted over the deck sidewall 94' (FIG. 2) on the right side of the vehicle 90. The side panels 20 and 20' are preferably bolted to the deck sidewalls 94 and 94' (FIG. 2) but may, alternatively, be secured using other conventional fastening means known in the art. The rearward most ends of the side panels 20 and 20' extend to the rearward most ends of the deck sidewalls 94 and 94' respectively. The opposite, forward most ends of the side panels 20 and 20' extend as far forward as necessary to create the desired size trunk. It should be appreciated that the side panels 20 and 20' may, alternatively, be mounted to the inside wall of the deck sidewalls 94 and 94', respectively.

Figure 7:
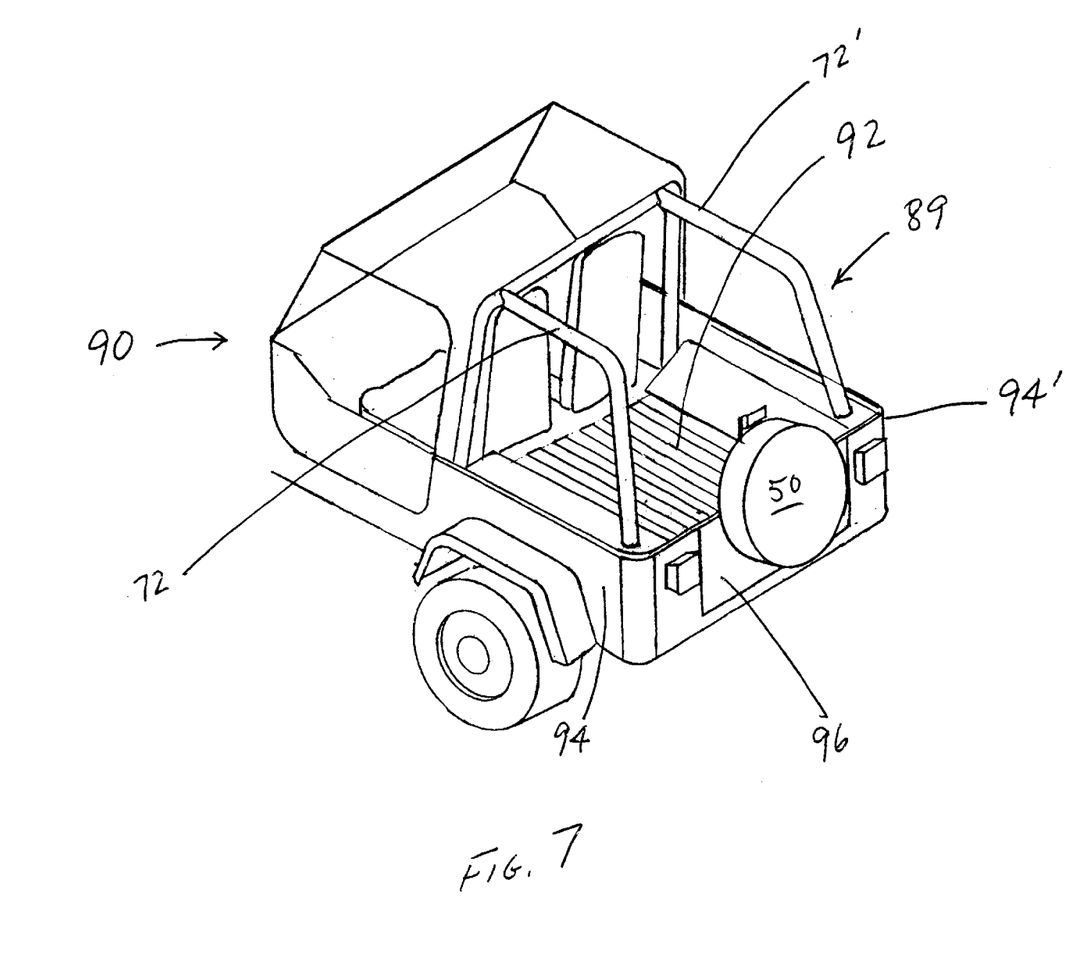
FIG. 7 is a top perspective view of a vehicle without the trunk creation system installed.

The end panel 30 extends between the forward most end of the side panels 20 and 20' and the corresponding deck side walls 94 and 94' behind the driver's and front passenger s seats 88. The end panel 30 further extends down to the vehicle load deck 92 (FIG. 7). The side panels 20 and 20', deck sidewalls 94 and 94', end panel 30, vehicle tailgate 96 (FIG. 2) and vehicle load deck 92 (FIG. 7) define a trunk compartment for transporting items.

Figure 4:
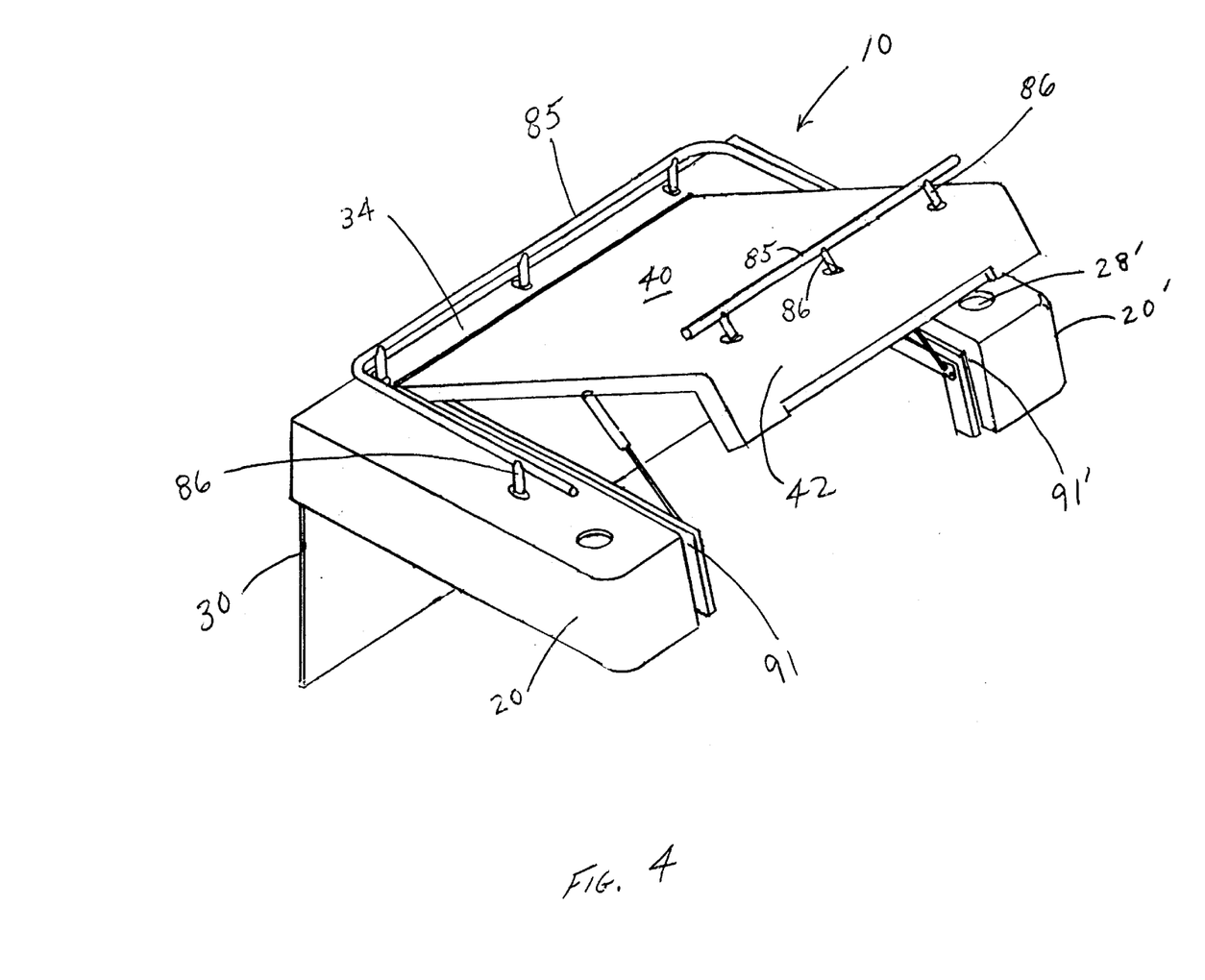
FIG. 4 is a top perspective view of the trunk creation system with the door open.

Referring now also to FIG. 4, the access door 40 is hingedly connected to the upper end 34 of the end panel 30 and is structured for swinging movement from an open position, wherein the trunk compartment is accessible, to closed position, wherein the trunk compartment is enclosed. Since the height of the vehicle tailgate 96 (FIG. 7) typically, extends only up to the height of the deck sidewalls 94 and 94', the access door 40 includes a front, downwardly disposed portion 42, best seen in FIG. 6, structured to mate with the tailgate 96.

Figure 6:
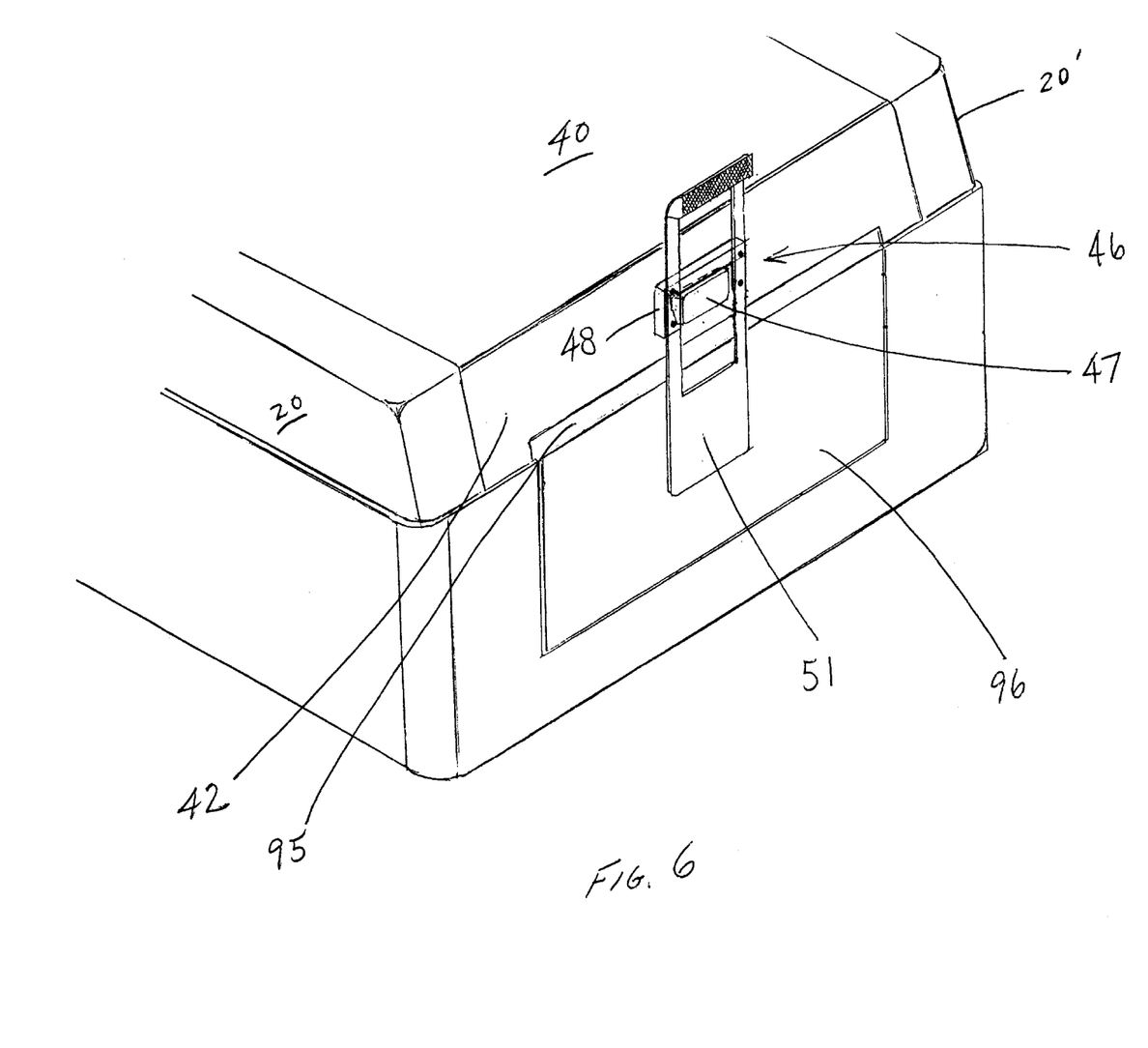
FIG. 6 is a top perspective view of the trunk creation system showing the latching mechanism.

Referring now also to FIG. 6, in the preferred embodiment, a latching mechanism 46 is provided to latch the tailgate 96 to the rear portion 42 of the access door 40. In this embodiment, the rear portion 42 of the door 40 includes a male latching portion 47 structured for mating engagement with a rectangular, female, latching portion 48 extending up from the tailgate 96. The lower portion of the female latching portion 48 abuts a spare tire mount 51, attached to the tailgate 96 by conventional means. The male and female latching portions 47 and 48, respectively, are secured to mate with one another when the access door 40 is in the second closed position (FIG. 6) and the tailgate 96 is closed, thereby retaining the access door 40 in the closed position and securing any items therein. A key lock or other conventional locking mechanism may be provided to lock the latching mechanism 46.

The upper portion of the tailgate 96 includes an inwardly disposed step 95, structured to sit within a horizontally disposed recess 43 (FIG. 3) along the lower edge of the rear portion 42 of the access door 40. The step 95 and recess 43 act as a gutter to keep water from entering the newly-created storage compartment through the gap between the rear portion 42 of the access door 40 and the tailgate 96.

Figure 5:
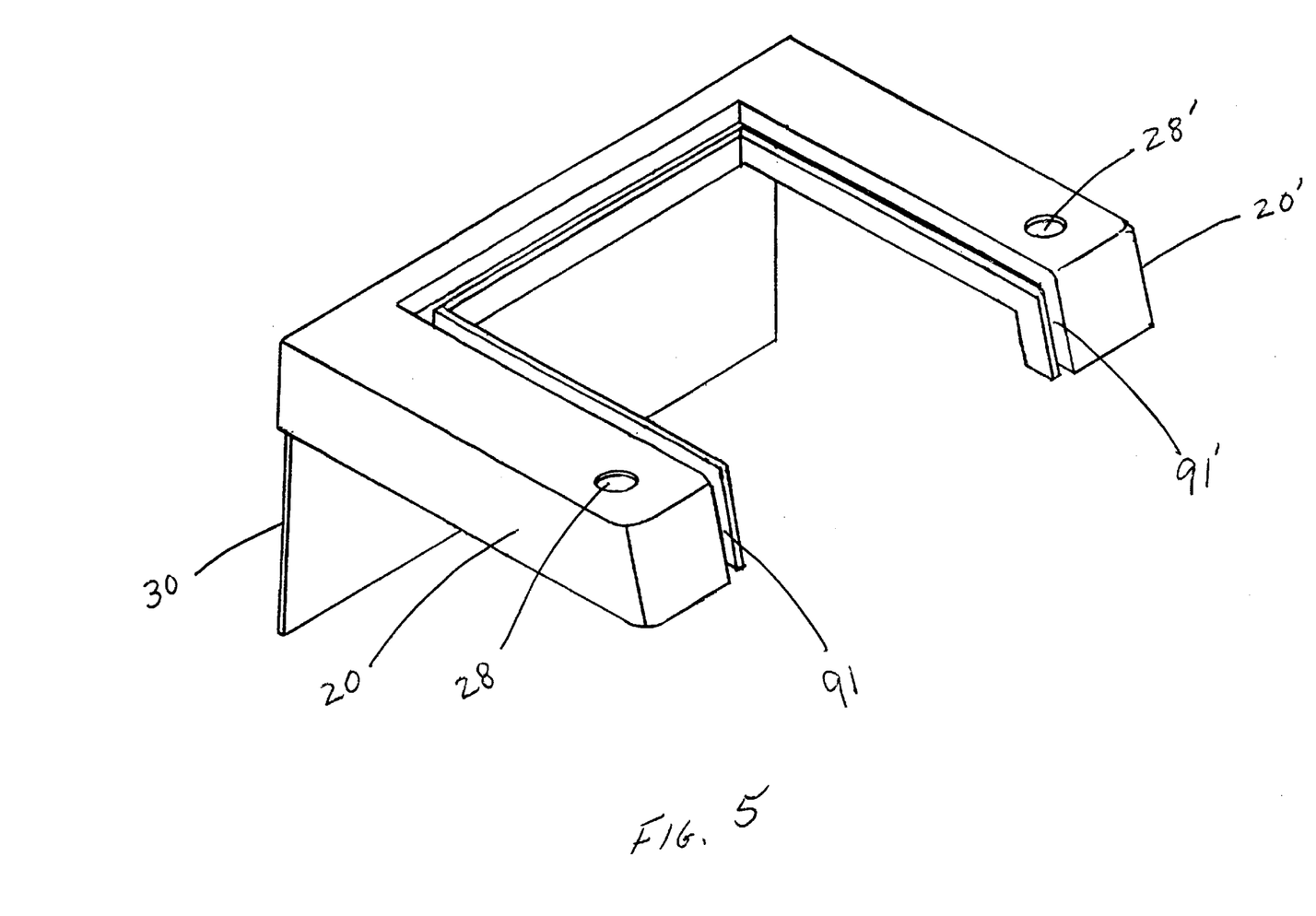
FIG. 5 is a top perspective view of the trunk creation system with the door removed.

Referring now to FIG. 5, channels 91 and 91' are also provided, respectively, along the inside edge of the side panels 20 and 20' and the end panel 30 to act as gutters to direct water away from the trunk compartment, thereby creating a watertight seal so that the trunk compartment and any items stored therein remain dry.

Referring again to FIG. 3, for vehicles having a roll bar system 70 (FIG. 2), holes 28 and 28' are provided in the side panels 20 and 20', respectively, to accommodate the roll bars 72 and 72' extending from the deck sidewalls 94 and 94', respectively. In such vehicles, the roll bars 72 and 72' are removed prior to mounting the side panels 20 and 20' over the deck sidewalls 94 and 94', and then replaced through the holes 28 and 28' in the side panels 20 and 20' after the side panels have been mounted to the deck sidewalls 94 and 94'. Alternatively, slots (not shown) may be provided in the side panels 20 and 20' to allow them to be mounted over the deck sidewalls 94 and 94' without removing the roll bars 72 and 72'.

The side panels 20 and 20', end panel 30 and access door 40 may be constructed of hardened plastic, preferably F.R.P. with foam cored lid, or plexiglas, steel, aluminum, roto-cast plastic, or any other material suitable to provide the necessary strength, security and waterproofing capabilities. Additionally, the side panels 20 and 20', end panel 30 and access door 40 may be painted to match the appearance of the vehicle, so that the storage trunk creation system 10 appears to be an integral part of the vehicle 90.

Referring again to FIG. 4, a guide tie-down rail 85 is mounted around the upper surface of the side panels 20 and 20', end panel 30 and rear portion of the access door 40. The guide rail 85 is preferably raised over the upper surface on which it is mounted a predetermined distance by extension bars 86 extending up from the upper surface of the side panels 20 and 20', end panel 30 and rear portion of the access door 40 to form a substantially enclosed area on top of the access door 40. Additional items may thus be retained above the newly-created, enclosed storage trunk space.

While the invention has been described, disclosed, illustrated and shown in various terms of certain embodiments or modifications, which it has presumed in practice, the scope of the invention is not intended to be, nor should it be deemed to be, limited thereby; such other modifications or embodiments as may be suggested by the teachings herein are particularly reserved, especially as they fall within the breadth and scope of the claims here appended.

What is claimed is:

1. A storage trunk creation system for a vehicle having a load deck, deck sidewalls and a tailgate comprising:
    a) a pair of side panels, each of said side panels having a forward most end and being mounted to respective deck sidewalls of a vehicle in generally parallel relation thereto, each of said pair of side panels extending substantially to a most rearward end of said deck side walls;
    b) an end panel extending between said forward most ends of said side panels and down to a vehicle load deck, said end panel, said side panels, said deck sidewalls and said load deck defining a storage trunk compartment; and
    c) an access door connected to said end panel, said access door being structured for swinging movement from a first, open position, wherein said storage trunk compartment is accessible, to a second, closed position, wherein said storage trunk compartment is enclosed.

2. The storage trunk creation system as recited in claim 1, wherein said side panels are mounted to said deck sidewalls in overlying relation thereto.

3. The storage trunk creation system as recited in claim 2, wherein the vehicle is a jeep, said jeep having a roll bar system extending from said deck sidewalls.

4. The storage trunk creation system as recited in claim 3, wherein each of said side panels includes at least one hole extending vertically there through, said at least one hole being structured and disposed to receive a bar from said roll bar system.

5. The storage trunk creation system as recited in claim 1, wherein said side panels extend to a rearward most end of said deck sidewalls.

6. The storage trunk creation system as recited in claim 1, further comprising means for latching said access door to said tailgate so that closing said access door relative to said tailgate secures said access door in said second, closed position.

7. The storage trunk creation system as recited in claim 1, further comprising a rail mounted to and extending across said side panels and said end panel.

8. The storage trunk creation system as recited in claim 1, further comprising a continuous channel disposed along an inside edge of said side panels and said end panel, said continuous channel being structured to direct water away from said storage trunk compartment.

9. The storage trunk creation system for a vehicle having a load deck, deck sidewalls and a tailgate comprising;
    a) a pair of side panels, each of said side panels being mounted to a deck sidewall in generally parallel relation thereto, said side panels extending to a rearward most end of said deck sidewalls;
    b) an end panel extending between a forward most end of said side panels and down to a load deck of the vehicle, said end panel, said side panels, said deck sidewalls and said load deck defining a storage trunk compartment;
    c) an access door connected to said end panel, said access door being structured for swinging movement from a first, open position, wherein said storage trunk compartment is accessible, to a second, closed position, wherein said storage trunk compartment is enclosed; and
    d) means for latching said access door to a tailgate so that closing the said access door and tailgate secures said access door in said second, closed position.

10. The storage trunk creation system as recited in claim 9, wherein said side panels are mounted to said deck sidewalls in overlying relation thereto.

11. The storage trunk creation system as recited in claim 10, wherein the vehicle is a jeep, said jeep having a roll bar system extending out from the deck sidewalls.

12. The storage trunk creation system as recited in claim 11, wherein each of said side panels include at least one hole extending vertically there through, said holes being structured and disposed to receive bars from the roll bar system there through.

13. The storage trunk creation system as recited in claim 9, further comprising a continuous channel disposed along an inside edge of said side panels and end panel, said channel being structured to direct water away from said trunk compartment.

14. The storage trunk creation system as recited in claim 9, wherein said means for latching said access door to said tailgate comprises a generally rectangular-shaped, female member having a generally centrally disposed slot extending above said tailgate, said slot being structured for mating engagement with a male member extending from a rearwardly disposed end of said access door.

15. The storage trunk creation system as recited in claim 14, further comprising a plate-like member mounted to said tailgate, said plate-like member having an inwardly disposed step seated above an upper edge of said tailgate, said step being structured to sit within a horizontally disposed recess in said rearwardly disposed end of said access door, thereby preventing water from entering said storage trunk compartment between said access door and said tailgate.

16. The storage trunk creation system as recited in claim 9, wherein said access door is hingedly connected to said end panel.

* * * * *